United States Patent [19]
Vargo

[11] 3,745,634
[45] July 17, 1973

[54] RUBBERIZED METAL REINFORCED BELT GROMMET INSTALLING MACHINE

[76] Inventor: William J. Vargo, 1631 Huguelet St., Akron, Ohio 44305

[22] Filed: Oct. 13, 1971

[21] Appl. No.: 188,725

[52] U.S. Cl. ............... 29/200 P, 29/243.52, 29/513
[51] Int. Cl. ...................... B23p 19/00, B23p 11/00
[58] Field of Search ...................... 29/200 B, 200 P, 29/243.52, 513

[56] References Cited
UNITED STATES PATENTS

| | | | |
|---|---|---|---|
| 1,123,153 | 12/1914 | Williams | 29/243.52 |
| 2,805,588 | 9/1957 | Sterling | 29/243.52 |
| 3,310,871 | 3/1967 | Humiston | 29/513 X |
| 3,335,704 | 8/1967 | Freebourn | 20/200 P |

Primary Examiner—Thomas H. Eager
Attorney—Albert H. Oldham et al.

[57] ABSTRACT

The invention relates to an apparatus for affixing grommets to rubberized reinforced belts which have been previously punched with holes for receiving the grommets. The apparatus includes rolls for supporting the belt and advancing it past the grommet-installing station. The installing station includes a pair of forming dies and a positioning pin. The first forming die presses the grommet and the retaining plate firmly onto the belt and paritally bends the tabs of the grommet outwardly. The second forming die completes the bending of the tabs so that they lie parallel to the retaining plate. The locating pin passes through an installed grommet to precisely locate the holes in the belt in the grommet relative to the forming dies. The dies and the locating pin are carried on a common ram so that the initial forming or bending of the grommet tabs is performed at one hole while the final bending is simultaneously performed at an adjacent hole.

11 Claims, 12 Drawing Figures

PATENTED JUL 17 1973 3,745,634

INVENTOR.
WILLIAM J. VARGO
BY
Oldham & Oldham
ATTORNEYS

INVENTOR.
WILLIAM J. VARGO
BY
Oldham & Oldham
ATTORNEYS

RUBBERIZED METAL REINFORCED BELT GROMMET INSTALLING MACHINE

In my earlier filed co-pending application entitled Method and Apparatus for Punching Rubberized Wire Reinforced Sheet Material, Ser. No. 174,725, filed Aug. 25, 1971, there is disclosed apparatus for punching precision holes in a wire reinforced rubber sheet material such as an endless rubber belt. The present application relates to apparatus for installing metal reinforcing grommets in such precision punched holes. It should be understood, however, that the apparatus of the present invention may be used to install grommets in sheet material other than endless belts and in material in which the holes are formed by methods other than punching.

In various types of equipment, an endless rubber belt is entrained over a sprocket wheen which engages holes in the belt for driving the same. If large forces must be transmitted between the sprocket wheel and the belt, it is necessary to provide metal reinforcing grommets at the holes to prevent rapid wear and enlargement of the holes. One such situation is the use of endless belts as drive tracks for snow mobiles.

The primary or ultimate object of the present invention is the provision of apparatus for securely fastening metal grommets to the sprocket engaging holes of reinforced rubberized material.

It is also an object of the present invention to provide apparatus for installing reinforcing grommets at previously punched holes of rubberized sheet material which operates in an efficient manner and which includes means to assure the precise alignment of the grommets.

A further object of the present invention is the provision of apparatus for applying grommets to rubberized sheet material which includes means to precisely position the sheet material to the grommet forming members, and means to perform a first bending operation on the grommets together with means to complete the forming of the grommets, the locating means and the two forming means operating simultaneously.

The above and other objects of the invention which will become apparent in the following detailed description are achieved by providing apparatus which consists, essentially, of means for supporting and advancing the reinforced rubberized sheet material, a locating member for precisely positioning the material, a first forming die to press the grommet and retaining plate together and to partially bend the tabs of the grommet, a second forming die to complete the outward bending of the grommet tabs, and power means for operating the locating means and the two forming dies simultaneously.

For a more complete understanding of the invention and the objects and advantages thereof reference should be had to the following detailed description and the accompanying drawings wherein there is shown a preferred embodiment of the invention.

Figure 1:
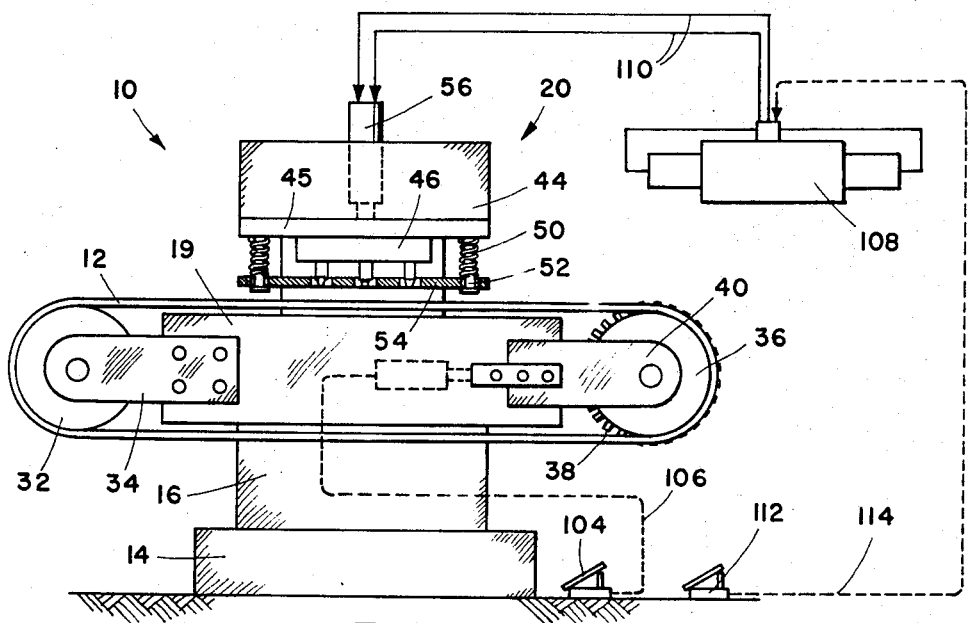
FIG. 1 is a front elevational view showing a preferred embodiment of the invention adapted to apply grommets to an endless reinforced rubber belt, the view being somewhat schematic.
Figure 2:
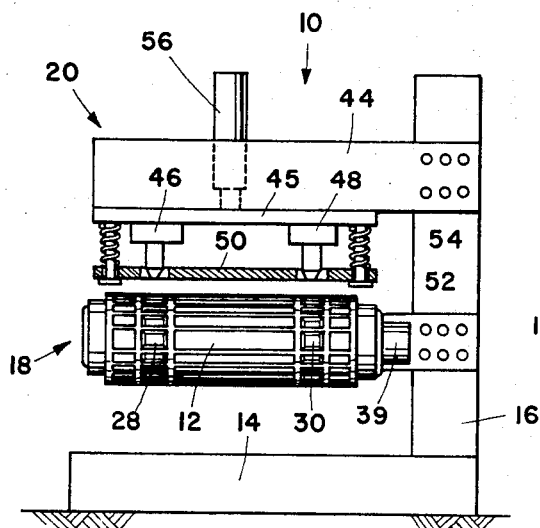
FIG. 2 is a side elevational view of the machine of FIG. 1.

Reference should first be had to FIGS. 1 and 2. The grommet installing apparatus, designated generally by the reference numeral 10 is designed to install the grommets in an endless rubber belt 12, the machine being arranged to install grommets simultaneously in two series of previously formed holes in the endless belt. It will be understood, however, that the disclosed machine may be modified to install grommets on materials other than endless belts and to install a lesser or greater number of grommets simultaneously.

The apparatus 10 includes a base 14 to which is affixed a vertical support column 16 which carries the belt supporting and advancing mechanism 18 and the grommet affixing assembly 20. The assemblies 18 and 20 will be described in greater detail below.

Figure 3:
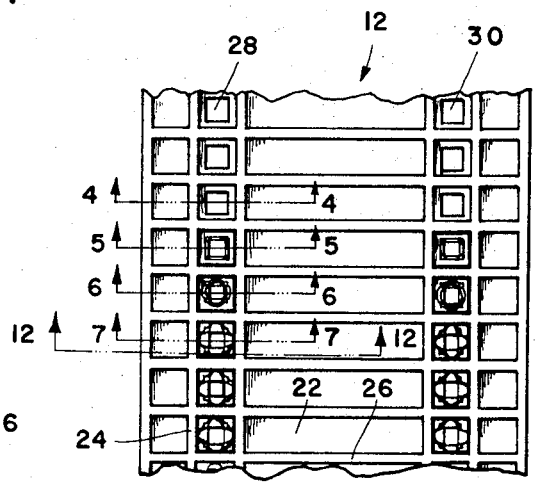
FIG. 3 is a fragmentary plan view of the reinforced rubber belt.
Figures 4, 12:
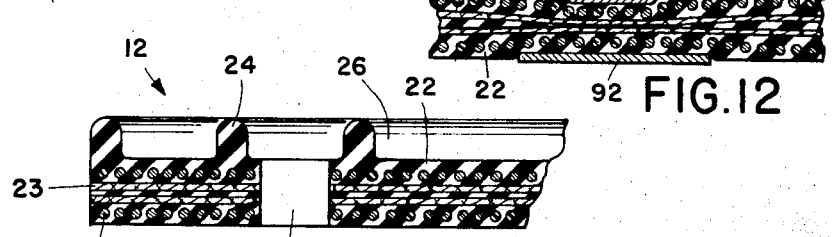
FIGS. 4–7 are fragmentary sectional views taken along the lines 4—4 to 7—7, respectively, of FIG. 3 and showing successive stages in the installation of the grommets.
FIG. 12 is a fragmentary sectional view taken along the line 12—12 of FIG. 3.

One form of reinforced rubberized belts to which the grommets may be applied is illustrated in FIGS. 3 and 4. This belt consists of an endless band or sheet of rubber material 22 which has transverse and longitudinal reinforcing wires 23 and 25, respectively. The belt may be provided with transverse ribs 24 and longitudinal ribs 26, if desired, such ribs being advantageous where the belt is used as a snow mobile track to provide a traction relationship with snow, mud, or the like. In any event, the belt has a series of holes 28 punched therethrough in a longitudinal path. In the embodiment illustrated, a second series of holes 30 are also punched in the belt along a second longitudinal path. These holes 28 and 30 engage the sprockets of the drive wheel and are reinforced by grommets installed by means of the apparatus of the present invention.

Figure 11:
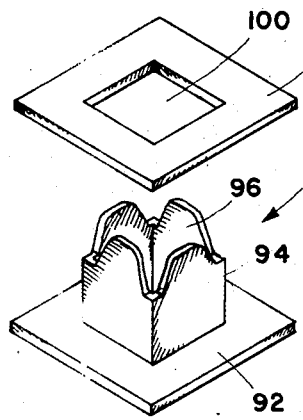
FIG. 11 is an isometric view of the grommet and retaining plate prior to installation.

One form of the grommet is illustrated in FIG. 11. As can be seen from this figure, the grommet 90 has a base flange 92 with a central opening and upward projecting walls 94 which extend substantially perpendicular to the flange 92 and surround the central opening thereon to form a channel-like arrangement having close fitting relation with the side walls of the holes 28 of the belt 12. The walls 94 terminate in tab portions 96. The retaining plate 98 having a central opening 100 is received over the tab portion 96 of the grommet 90 and, as will become apparent below, the retaining plate 98 is held in place by the tabs 96 when they are bent outwardly. It should be understood that while the holes 28 are square in the drawings, other configurations may be used if desired and the wall portions 94 of the grommet 90 will have a complimentary configuration. Also, the flange 90 of the grommet and the retaining plate 98 may have configurations other than the square configuration illustrated. The particular configurations and dimensions of the grommet 90 and the retaining plate 98 will be determined by the particular application to which the belt is to be placed.

Referring again to FIGS. 1 and 2, the apparatus of the present invention will now be diescribed in greater detail. The belt supporting and advancing assembly 18 includes a frame 19. A roller 32 is journaled on suitable brackets 34 at one end of the frame 19 and a second driven roller 36 having sprocket teeth 38 is journaled in a second bracket 14 at the opposite end of the frame 19. The endless belt 12 is entrained over the rollers 32 and 36. In order to maintain a controlled tension on the belt 12 the bracket 40 may be slidably carried on the frame 19 and suitable means such as the air cylinder 42 attached to the bracket to maintain tension on the belt 12. This tensioning of the belt 12 is important both to maintain precise uniform separations between adjacent ones of the holes 28 and to prevent excessive deformation of the belt during the grommet applying operations. The top surface of the frame 19 provides a supporting table for the belt and the grommets in co-operation with the grommet applying assembly 20.

The grommet applying assembly 20 includes a second supporting frame 44 which is affixed to the vertical column 16. A vertically movable platen 45 is carried on the lower surface of the support frame 44 and this platen 45 carries two dies holding plates 46 and 48, the plate 46 being positioned in alignment with the series of holes 28 while the plate 48 is in alignment with the hole series 30. Suitable means such as the hydraulic cylinder 56 are provided for effecting the vertical movement to the platen 45 and the die assemblies 46 and 48 carried thereby. A stripper plate 50 is also affixed to the platen 45, the plate 50 being slidably carried on vertical rods 52 which terminare in enlarged head portions 53. Coil springs 54 carried by the rods 52 bias the stripper plate 50 into its downward position.

Figure 8:
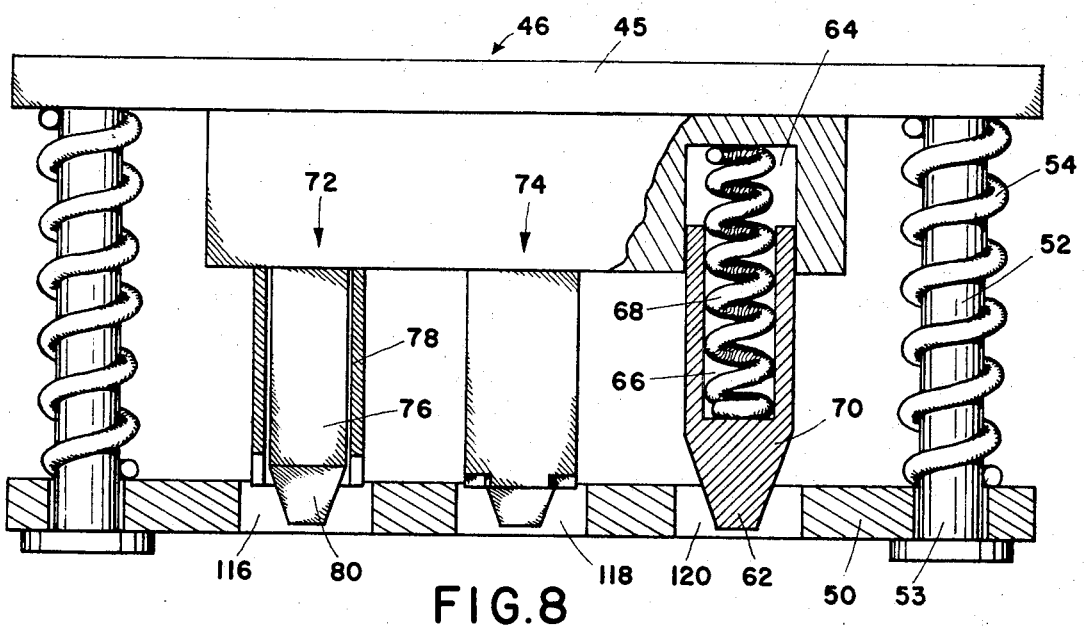
FIG. 8 is an enlarged fragmentary sectional view of the locating and forming assembly of the machine of FIG. 1.
Figure 9:
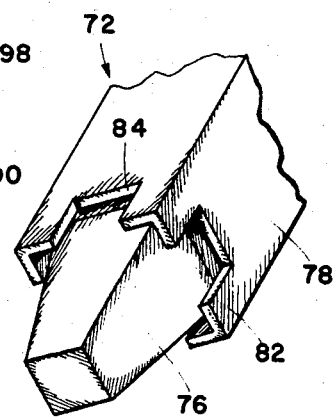
FIG. 9 is an isometric view of the first grommet forming die.
Figure 10:
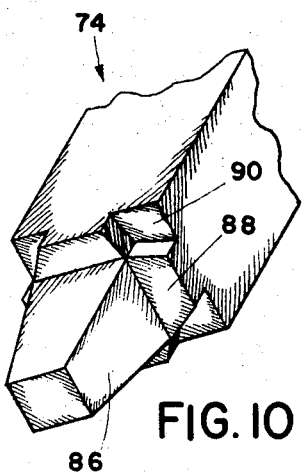
FIG. 10 is an isometric view of the second grommet forming die.

One of the die assemblies 46 is illustrated in FIG. 8 and the two die members of this assembly are illustrated, respectively, in FIGS. 9 and 10. The other die assembly 48 is of identical construction. As will be seen from FIG. 8, an aligning pin 62 is slidably received in a bore 64 of the die blcok 60, the pin 62 having a hollow interior 66 for receiving a coil spring 68 which urges the pin 62 downwardly. The lower end of the pin 62 has tapered surfaces 70 so that the pin will be guided easily into the opening of a previously installed grommet of the belt 12 and will cause shifting of the belt, if necessary, to assure precise alignment. Also carried by the die block 60 is a first forming die 72 and a second forming die 74. As can be seen from FIGS. 8 and 9, the first forming die 72 has an inner die member 76 and an outer die member 78. The inner die member 76 has a tapered lower portion 80 while the outer die member has a stepped configuration at its lower end providing protruding steps 82 at each corner of the die member at recessed portions 84 intermediate to step portions 82. The second die member, which is illustrated in FIG. 10, has a tapered lower portion 86 which terminates in shoulders 88, the corner portions 90 between adjacent shoulders 88 being cut away to a depth approximately equal to the thickness of the grommet tab portions 96.

Figure 5:
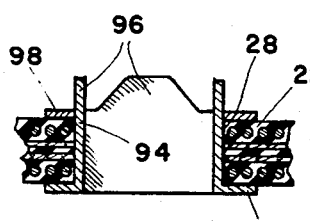
Figure 6:
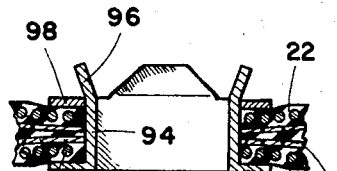
Figure 7:
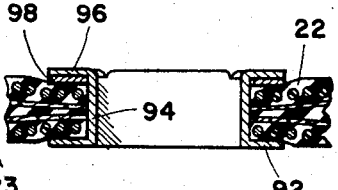

The sequence of operations by which a grommet is secured to a hole 28 of the belt 12 is illustrated in FIGS. 5, 6, and 7. FIG. 5 illustrates a grommet positioned within the hole 28, this may be done by any suitable means in the region of the belt between the roll 32 and the grommet securing assembly 20. The grommet is positioned in the hole 28 so that the walls 94 extend upwardly through the hole with the flange 92 engaging the lower surface of the belt material 22. The retaining plate 98 is positioned on top of the material 22 and the tab portions 96 of the grommet protrude through the opening of the retaining plate. When a grommet 90 with retaining plate 98 is positioned below the first forming die 72 and the cylinder 56 actuated, downward movement of the forming dies 72 occurs. The stepped corners 82 of the outer die member engage the corners of the retaining plate 98 to force this plate toward the flange 92, causing some compression of the rubber material 22. At the same time the tapered lower portion 80 of the inner die member engages the tabs 96 to effect a partial outward bending of each of these tabs. This bending is sufficient to hold the retaining plate 98 in place maintaining the compression on the rubber material 22. The belt 12 is then advanced to bring the partially formed grommet into alignment with the second forming member 74. Upon the next downward movement of the die assembly the forming member 74 completes the installation of the grommet, the tapered portion 86 and the shoulders 88 serving to complete the bending of the tabs 96. The corner portions 90 of the second forming die 74 are cut away by a depth approximately equal to the thickness of the tabs 96. As a result, the corners of the retaining plate 98 are not contacted by die member 74 until substantially complete bending of the tabs 96 has occurred. As can be seen from FIG. 12, this results in a bending of the center portions 102 of each side of the retaining member 98 so that the outer surface of the completed grommet is substantially plainer, the tabs 96 and corners of the retaining plate 98 being substantially uniform.

As will be seen from FIG. 8, the stripper plate 50 is provided with openings 116, 118, and 120 which are aligned, respectively, with the first forming member 72 the second forming die 74 and the aligning pin 62. The stripper plate 50 operates in the usual manner, moving upwardly on the rods 52 as the lower surface of the plate 50 contacts the upper surface of the belt material 22 while the forming dies 72 and 74 and the aligning pin 62 move through their respective openings. Upon upward movement of the die assembly 46, the stripper plate 50 is forced downwardly by the compressed coil springs 54 and forces the rubber sheet 22 and the grommets free from the forming dies and the aligning pin.

The center-to-center separation between the first and second forming dies 72 and 74 and between the center of the second forming die 74 and the aligning pin 62 are equal to each other and are equal to the separation between adjacent ones of the holes 28 or 30 of the belt, Thus, on each downward movement of the die assembly the aligning pin 62 will pass through a previously installed grommet to assure proper alignment of the next two holes with the respective forming members of each cycle consisting of a downward and upward stroke of the die assembly, the belt 12 is indexed forward by the distance equal to the separation between an adjacent set of holes upon completion of each cycle.

Suitable control means are provided for the apparatus, these means being illustrated schematically in FIGS. 1 and 2. Thus, the cylinder 42 may be controlled by a foot valve 104 through an air line 106. Control of the operation of the hydraulic cylinder 56 may be effected by means of the air-hydraulic valve 108 controlling the cylinder 56 through the lines 110 and being controlled by the foot switch 112 through the air line 114. While manual control means are illustrated, it will be understood that other control systems may be employed and automatic controls may be utilized if desired.

While only the best known embodiment has been illustrated and described in detail herein it will be understood that the invention is not limited thereto or thereby. Reference should therefore be had to the appended claims in determining the true scope of the invention.

I claim:

1. Apparatus for installing grommets in previously formed uniformly spaced holes in rubberized sheet material, each grommet having a base flange with a central opening, walls extending substantially perpendicular to the flange, surrounding the central opening thereof and terminating in tab portions, and a retaining plate having a central opening for receiving the tabs, comprising:
   a frame;
   means carried by the frame for supporting the sheet material;
   a first die assembly adapted to pass between the walls of the grommet to effect a partial outward bending of the tab portions;
   a second die assembly adapted to engage the tab portions to effect additional bending thereof to positions substantially perpendicular to the walls of the grommet, the second die assembly being spaced from the first die assembly by a distance equal to the separation between adjacent holes in the sheet material; and
   means to move the first and second die assemblies simultaneously.

2. Apparatus according to claim 1 further including an aligning pin carried by the die assembly moving means and spaced from the second die assembly by a distance equal to the separation between adjacent holes in the sheet material whereby the aligning pin engages a previously installed grommet when the die assemblies are moved to effect the bending of the top portions of respective grommets.

3. Apparatus according to claim 2 wherein the aligning pin is spring loaded.

4. Apparatus according to claim 1 wherein the first die assembly includes an inner die member having a tapered end portion for bending the top portions outwardly and an outer member surrounding the inner member and engaging the retaining plate to press the plate against the sheet material.

5. Apparatus according to claim 1 wherein the second die assembly includes a die member having a tapered end portion for effecting the further bending of the tab portions and a shoulder portion adjacent the end portion for effecting the final bending of the tab portions.

6. Apparatus according to claim 5 wherein the shoulder portion of the die member is stepped, the areas of the shoulder which overly the areas of the retaining plate between adjacent tabs being recessed by a depth substantially equal to the thickness of the tabs.

7. Apparatus according to claim 1 further including means to advance the sheet material by an amount equal to the separation between adjacent ones of the openings in the sheet material.

8. Apparatus according to claim 1 wherein the sheet material is an endless belt, the means supporting the material comprising first and second rolls on opposite sides of the die assemblies and supporting table means between the rolls.

9. Apparatus according to claim 8 wherein one of the rolls is movable relative to the other roll to apply tension to the belt.

10. Apparatus for securing a grommet in an opening in rubberized material, the grommet having wall portions extending through the opening, a flange portion secured to the wall portions and lying against the opposite surface of the material, the wall portions extending through the hole in the retaining plate and being bent outwardly to overly the plate, comprising:
    a frame;
    support means carried by the frame and providing a supporting surface for the material and the flange of the grommet;
    forming means positioned on the opposite side of the material from the support means, the forming means including a first member adapted to effect a partial outward bending of the wall postions while pressing the retaining plate to cause partial compression of the material and a second member engaging the partial bent wall portions to effect further bending thereof; and
    a ram for moving the forming means toward and away from the support means.

11. Apparatus according to claim 10 wherein the material has a plurality of openings, a grommet being secured at each opening, the apparatus including means to move the material to bring successive ones of the openings into registry with the forming means.

* * * * *